US007627071B2

(12) United States Patent
Chin et al.

(10) Patent No.: US 7,627,071 B2
(45) Date of Patent: Dec. 1, 2009

(54) TIMING SYNCHRONIZATION MODULE AND METHOD FOR SYNCHRONOUSLY PLAYING A MEDIA SIGNAL

(75) Inventors: Yi-Lon Chin, Yonghe (TW); Chang-Hung Lee, Dounan Township, Yunlin County (TW)

(73) Assignee: Qisda Corporation, Taoyuan County (TW)

( * ) Notice: Subject to any disclaimer, the term of this patent is extended or adjusted under 35 U.S.C. 154(b) by 658 days.

(21) Appl. No.: 11/366,427

(22) Filed: Mar. 3, 2006

(65) Prior Publication Data

US 2006/0215741 A1    Sep. 28, 2006

(30) Foreign Application Priority Data

Mar. 10, 2005    (TW) .............................. 94107379 A

(51) Int. Cl.
*H03D 3/24* (2006.01)
(52) U.S. Cl. ........................ 375/376; 375/359; 375/360; 375/371; 375/375; 327/141; 327/156
(58) Field of Classification Search ................. 375/215, 375/220, 294, 327, 354, 359, 360, 364–366, 375/369–370, 372–373, 376, 355, 371, 375; 327/141, 156; 370/204, 389, 412
See application file for complete search history.

(56) References Cited

U.S. PATENT DOCUMENTS 5,623,483 A    4/1997   Agrawal et al.
6,970,526 B2 * 11/2005  Min ............................ 375/354
7,102,446 B1 *  9/2006  Lee et al. ...................... 331/11
7,355,652 B2 *  4/2008  Gudmondson et al. ...... 348/536
7,369,000 B2 *  5/2008  Wu et al. ..................... 331/1 R
2006/0072694 A1 *  4/2006  Dai et al. .................... 375/354
2006/0161675 A1 *  7/2006  Ducharme et al. .......... 709/231
2006/0182211 A1 *  8/2006  Dollo et al. ................. 375/354
2007/0009071 A1 *  1/2007  Singh ......................... 375/354

\* cited by examiner

*Primary Examiner*—Shuwang Liu
*Assistant Examiner*—Hirdepal Singh

(57) ABSTRACT

The timing synchronization module includes a phase locked loop (PLL) and a synchronization processing unit. The PLL receives an output-end clock signal. When the PLL receives the output-end clock signal for the first time, the PLL generates a reception-end clock signal according to the output-end clock signal. The synchronization processing unit receives a procedure clock signal and the reception-end clock signal. The output-end clock signal has M clocks after the reception-end clock signal is generated, while the reception-end clock signal has N clocks as generated. When the difference value of M and N is larger than a preset value, the synchronization processing unit removes the media signal corresponding to the procedure clock signal and generates the reception-end clock signal again. When the difference value is smaller than the preset value, the synchronization processing unit controls media signal playing according to the reception-end clock signal and the procedure clock signal.

4 Claims, 4 Drawing Sheets

TIMING SYNCHRONIZATION MODULE AND METHOD FOR SYNCHRONOUSLY PLAYING A MEDIA SIGNAL

This application claims the benefit of Taiwan application Serial No. 94107379, filed Mar. 10, 2005, the subject matter of which is incorporated herein by reference.

BACKGROUND OF THE INVENTION

1. Field of the Invention

The invention relates in general to a timing module and method for playing a media signal, and more particularly to a timing synchronization module and method for synchronously playing a media signal.

2. Description of the Related Art

Wireless broadband network has stepped into a widespread stage, and is applied in international airports, hotels, restaurants, coffee chains for instance. The users can just roam leisurely in network world by inserting wireless local area network (LAN) cards into their notebook computers or personal digital assistants (PDAs). Network resources can therefore be rapidly and conveniently retrieved and applied without space limitation.

In a real-time encoder system, using wireless broadband technology to transmit media data and play the data instantly is also an application of the wireless technology. In addition to outputting data such as images and sounds to the reception module, the output module outputs clock signals to the reception module as a signal synchronization reference for the reception module.

However, the clock signals outputted by the output module may be incomplete at the beginning, or become incomplete as received by the reception module due to network delay, interference, or other factors in transmission. As a result, the media signals cannot be synchronized and played successfully.

SUMMARY OF THE INVENTION

It is therefore an object of the invention to provide a timing synchronization module and method for synchronously playing a media signal. The Media signal is played synchronously based on the difference between the output-end clock signal and the reception-end clock signal.

The invention achieves the above-identified object by providing a timing synchronization module for control the playing of a media signal. The timing synchronization module includes a phase locked loop (PLL) and a synchronization processing unit. The PLL is for receiving an output-end clock signal. When the PLL receives the output-end clock signal for the first time, the PLL generates a reception-end clock signal according to the output-end clock signal. The synchronization processing unit is for receiving a procedure clock signal and the reception-end clock signal. The output-end clock signal has M clocks after the reception-end clock signal is generated, the reception-end clock signal has N clocks as generated, and when a difference value of M and N is larger than a preset value, the synchronization processing unit removes the media signal corresponding to the procedure clock signal and generates the reception-end clock signal again. When the difference value is smaller than the preset value, the PLL outputs the reception-end clock signal, and the synchronization processing unit controls the playing of the media signal according to the reception-end clock signal and the procedure clock signal.

The invention achieves the above-identified object by providing a method for synchronously playing a media signal. The method includes receiving an output-end clock signal; determining whether the output-end clock signal is received for the first time, and if yes, generating a reception-end clock signal according to the output-end clock signal, wherein the output-end clock signal has M clocks after the reception-end clock signal is generated and the reception-end clock signal has N clocks as generated; determining whether a difference value of M and N is larger than a preset value; if yes, removing the media signal corresponding to a procedure clock signal, generating again the reception-end clock signal and returning to the step of receiving an output-end clock signal; and if not, controlling the playing of the media signal according to the reception-end clock signal and the procedure clock signal and repeating the step of determining whether a difference between M and N is larger than a preset value.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
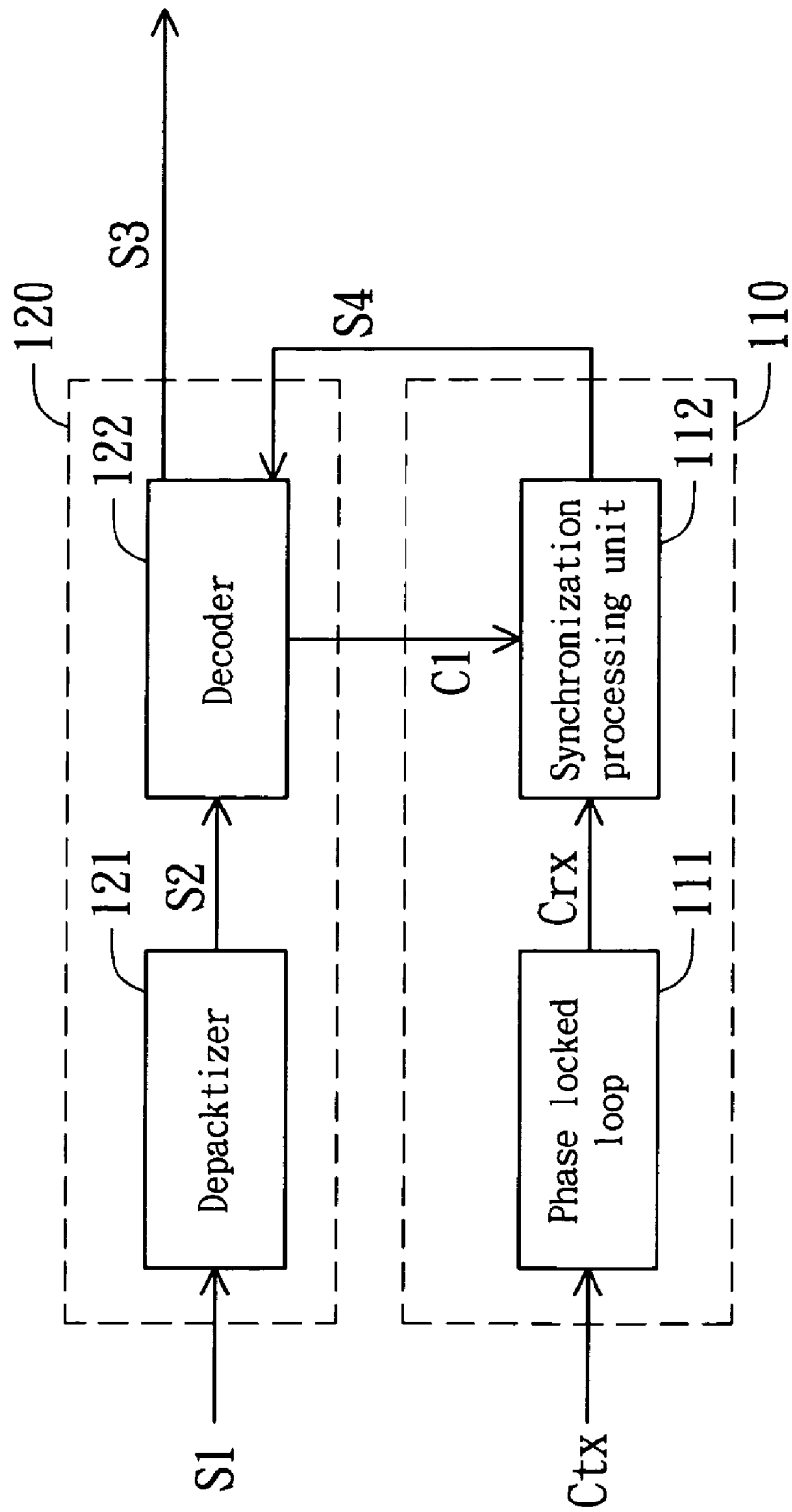
FIG. 1 is a block diagram of a reception module according to the first embodiment of the invention.

Referring to FIG. 1, a block diagram of a reception module according to the first embodiment of the invention is shown. The reception module 100 includes a timing synchronization module 110 and a signal processing module 120. The timing synchronization module 110, for controlling the playing of media signals S3, includes a phase locked loop (PLL) and a synchronization processing unit 112. The PLL 111 is for receiving output-end clock signals Ctx. When the PLL 111 receives the output-end clock signal Ctx for the first time, the PLL 111 generates a reception-end clock signal Crx according to the output-end clock signal Ctx. The synchronization processing unit 112 is for receiving a procedure clock signal C1 and the reception-end clock signal Crx. The signal processing module 120 includes a depacketizer 121 and a decoder 122. The depacketizer 121 receives a packet signal S1 and outputs a depacketized signal S2. The decoder 122 receives and decodes the depacketized signal S2, and then outputs the media signal S3 and the procedure clock signal C1. Moreover, the packet signal S1 and the output-end clock signal Ctx are transmitted through wireless network.

Suppose the output-end signal Ctx has M clocks after the reception-end signal Crx is generated and the reception-end signal Crx has N clocks as generated. Synchronization is determined according to the comparison of the difference value K of M and N, and a preset value Th. When the difference value K is larger than the preset value Th, the synchronization processing unit 112 controls the decoder 122 by a control signal S4 to remove the media signal S3 corresponding to the procedure clock signal C1, and the PLL 111 generates a reception-end clock signal Crx again according to the output-end clock signal Ctx. When the difference value K is smaller than the preset Th, the PLL 111 outputs the reception-end clock signal Crx, and the synchronization processing unit 112 controls the playing of the media signal S3 by the control signal S4 according to the reception-end clock signal Crx and the procedure clock signal C1.

Figure 2:
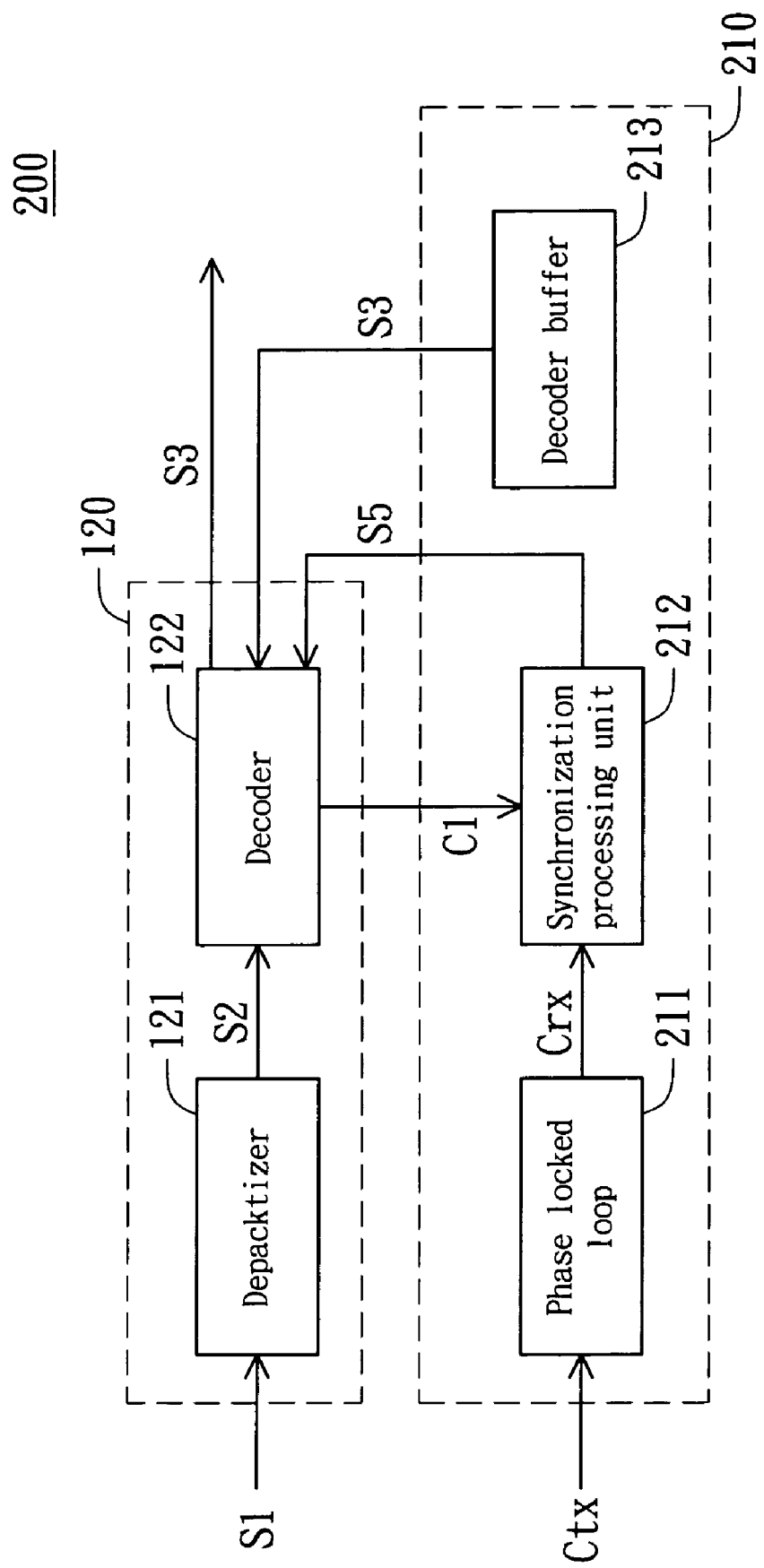
FIG. 2 is a block diagram of a reception module according to the second embodiment of the invention.

Referring to FIG. 2, a block diagram of a reception module according to the second embodiment of the invention is shown. The reception module 200 includes a timing synchronization module 210 and the signal processing module 120. The signal processing module 120, the same as that in the first embodiment, is not necessary to be described again. The timing synchronization module 210, for controlling the playing of the media signal S3, includes a PLL 211, a synchronization processing unit 212, and a decoder buffer 213. The PLL 211 is for receiving an output-end clock signal Ctx. When the PLL 211 receives the output-end clock signal Ctx for the first time, the PLL 211 generates a reception-end clock signal according to the output-end clock signal Ctx. The synchronization processing unit 212 receives a procedure clock signal C1 and the reception-end clock signal Crx. The output-end clock signal Ctx is transmitted through wireless network.

The output-end clock signal Ctx has M pulses after the reception-end clock signal Crx is generated while the reception-end clock signal Crx has N pulses as generated. Synchronization is determined according to the comparison of the difference value K of M and N with a first preset value Th1 and a second preset value Th2, wherein the first preset value Th1 is larger than the second preset value Th2. When the difference value K is larger than the first preset value Th1, the synchronization processing unit 212 removes the media signal S3 corresponding to the procedure clock signal C1, and the PLL 211 generates a reception-end clock signal Crx again according to the output-end clock signal Ctx. When the difference value K is smaller than the second preset value Th2, the PLL 211 outputs the reception-end clock signal Crx while the synchronization processing unit 212 controls the playing of the media signal S3 according to the reception-end clock signal Crx and the procedure clock signal C1.

When the difference value C1 is smaller than the first preset value Th1 and larger than the second preset value Th2, the synchronization processing unit 212 adjusts the capacity value BT of the decoder buffer 213 such that the media signal S3 corresponding to the procedure clock signal C1 is temporarily stored in the decoder buffer 213, and adjusts the speed of playing the media signal S3. The capacity value BT of the decoder buffer 213 is adjusted according to whether the reception-end clock signal Crx falls behind the output-end clock signal Ctx, that is, whether N is smaller than M. If N is smaller than M, the capacity value BT of the decoder buffer 213 is reduced while if N is larger than M, the capacity value BT of the decoder buffer 213 is increased. In the process of adjusting the speed of playing the media signal S3, if the media signal S3 is an audio signal, the original playing speed of 44100 Hz is reduced to 16000 Hz for instance, and if the media signal S3 is a video signal, the original playing speed of 30 fps is reduced to 24 fps for instance.

Figure 3:
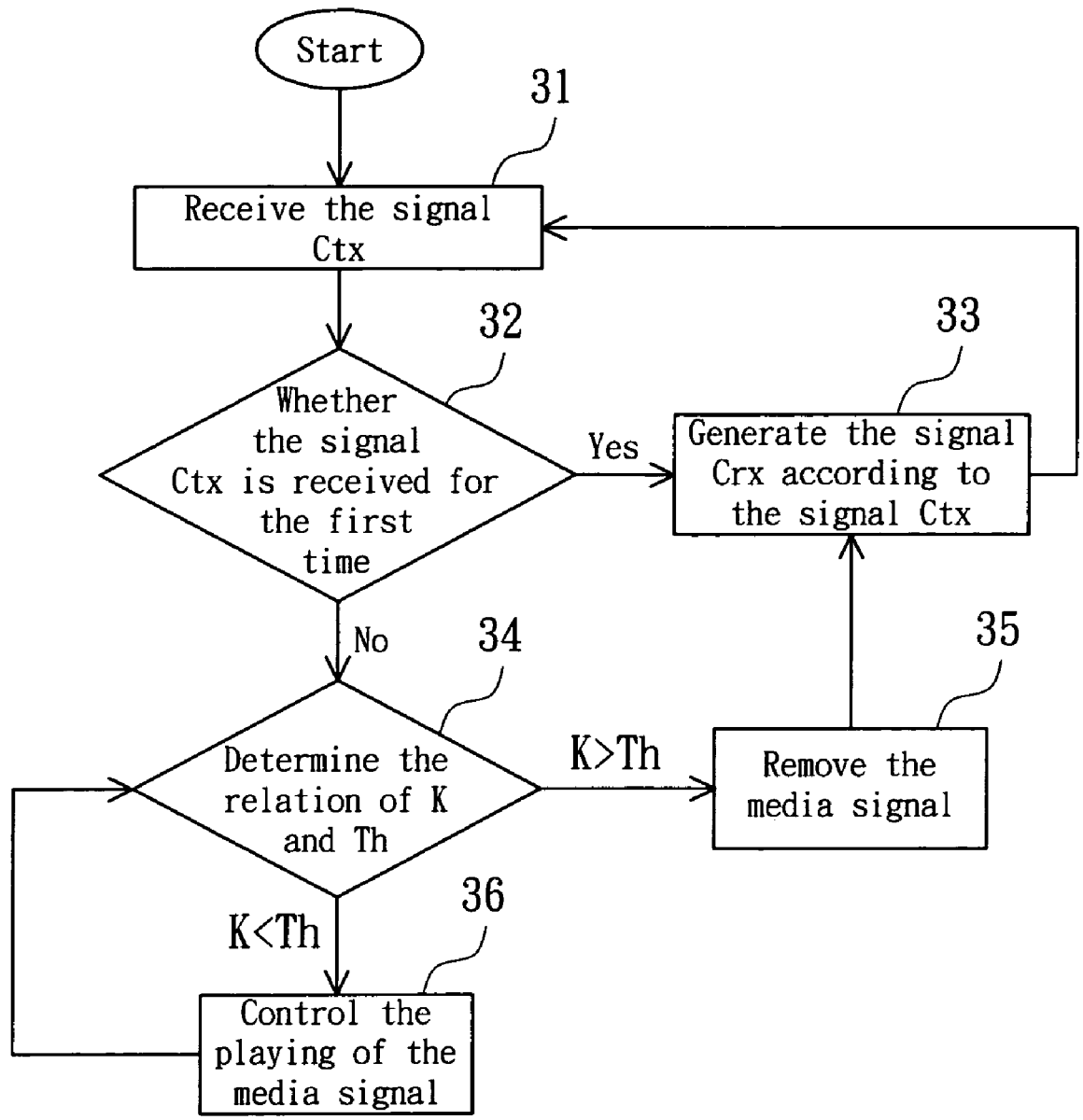
FIG. 3 is a flow chart of the method for synchronously playing media signals used in a reception module according to the first embodiment of the invention.

Referring to FIG. 3, a flow chart of the method for synchronously playing media signals used in a reception module 100 according to the first embodiment of the invention is shown. First, in step 31, receive an output-end clock signal Ctx. Next, in step 32, determine whether the output-end clock signal is received for the first time. If yes, go to the step 33 to generate a reception-end clock signal Crx according to the output-end clock signal Ctx. If not, go to the step 34 to determine whether the difference value K between M and N is larger than a preset value Th. The output-end clock signal Ctx has M clocks after the reception-end clock signal Crx is generated while the reception-end clock signal Crx has N clocks as generated. If K is larger than Th, go to step 35 to remove the media signal S3 corresponding to the procedure clock signal C1, and return to the step 33. If K is smaller than Th, go to step 36 to control the playing of the media signal S3 according to the reception-end clock signal Crx and the procedure clock signal C1, and repeat the step 34.

Figure 4:
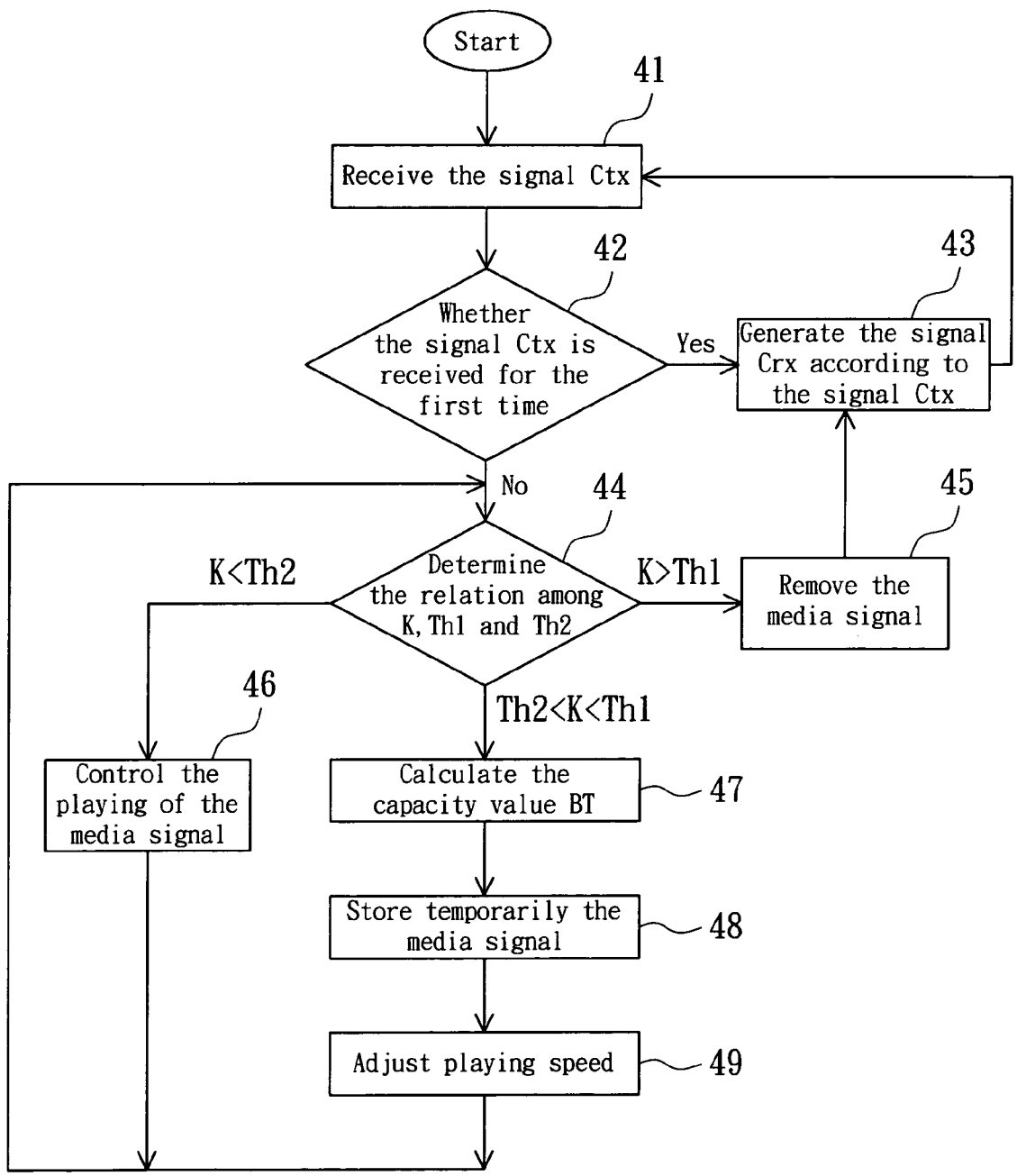
FIG. 4 is a flow chart of the method for synchronously playing media signals used in the reception module according to the second embodiment of the invention.

Referring to FIG. 4, a flow chart of the method for synchronously playing media signals used in the reception module 200 according to the second embodiment of the invention is shown. First, in step 41, receive an output-end clock signal Ctx. Afterward, in step 42, determine whether the output-end clock signal Ctx is received for the first time. If yes, go to step 43 to generate a reception clock signal Crx according to the output-end clock signal Ctx and return to the step 41. If not, go to step 44 to determine the relationship among the difference value K of M and N, the first preset value Th1 and the second preset value Th2. The output-end clock signal Ctx has M pulses after the reception-end clock signal is generated while the reception-end clock signal has N pulses as generated. The first preset value Th1 is larger than the second preset value Th2.

When the difference value K is larger than the first preset value Th1, go to step 45 to remove the media signal S3 corresponding to the procedure clock signal C1 and return to the step 43. When the difference value K is smaller than the second preset value Th2, go to step 46 to control the playing of the media signal S3 according to the reception-end clock signal Crx and the procedure clock signal C1, and return to the step 44.

If the difference value K is smaller than the first preset value Th1 and larger than the second preset value Th2, go to step 47 to calculate and adjust the capacity value BT of the decoder buffer 213. Afterward, in step 48, store temporarily the media signal S3 in the decoder buffer 213. Then in step 49, adjust the speed of playing the media signal S3 and return to the step 44.

In the timing synchronization module and method for synchronously playing media signals disclosed by the above-mentioned embodiments of the invention, the reception-end clock signal is generated by the output-end clock signal and synchronization is determined according to the difference between the reception-end clock signal and the output-end clock signal. Therefore, it can be prevented that wireless network interference and other factors result in the playing delay issue in playing media signals.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A timing synchronization module, for controlling the output of a media signal, the timing synchronization module comprising;
    a phase locked loop (PLL), for receiving an output-end clock signal, wherein when the PLL receives the output-end clock signal for the first time, the PLL generates a reception-end clock signal according to the output-end clock signal;

a synchronization processing unit, for receiving a procedure clock signal and the output-end clock signal; and a decoder buffer, wherein the output-end clock signal has M pulses after the reception-end clock signal is generated, the reception-end clock signal has N pulses as generated, wherein M and N are positive integers, and when a difference value between M and N is smaller than a first preset value and larger than a second preset value, the synchronization processing unit adjusts the volume of the decoder buffer so that the media signal corresponding to the procedure clock signal is stored temporarily in the decoder buffer, and adjusts the speed of playing the media signal;

wherein when the difference value is larger than the first preset value, the synchronization processing unit removes the media signal corresponding to the procedure clock signal, and the PLL generates the reception-end clock signal again according to the output-end clock signal;

wherein when the difference value is smaller than the second preset value, the PLL outputs the reception-end clock signal, and the synchronization processing unit controls the playing of the media signal according to the reception-end clock signal and the procedure clock signal.

2. The module according to claim 1, wherein the output-end clock signal is transmitted through wireless network.

3. The module according to claim 1, wherein the procedure clock signal and the media signal are outputted by a signal processing module, and the signal processing module comprises;

a depacketizer, for receiving the packet signal and outputting a depacketized signal; and a decoder, for receiving and decoding the depacketized signal, and for outputting the media signal and the procedure clock signal.

4. The module according to claim 3, wherein the packet signal and the output-end clock signal are transmitted through wireless network.

* * * * *

UNITED STATES PATENT AND TRADEMARK OFFICE
CERTIFICATE OF CORRECTION

PATENT NO. : 7,627,071 B2  Page 1 of 1
APPLICATION NO. : 11/366427
DATED : December 1, 2009
INVENTOR(S) : Chin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Twenty-first Day of December, 2010

David J. Kappos
*Director of the United States Patent and Trademark Office*